United States Patent [19]

Peirce

[11] Patent Number: 5,384,449
[45] Date of Patent: Jan. 24, 1995

[54] AUTHORIZATION MATCHING SYSTEM

[75] Inventor: Roger L. Peirce, Los Altos, Calif.

[73] Assignee: Visa International Service Association, San Mateo, Calif.

[21] Appl. No.: 876,727

[22] Filed: Apr. 28, 1992

[51] Int. Cl.6 .......................................... G06K 5/00
[52] U.S. Cl. ................................................ 235/380
[58] Field of Search ........................................ 235/380

[56] References Cited

U.S. PATENT DOCUMENTS

| | | | |
|---|---|---|---|
| 4,386,266 | 5/1983 | Chesarek | 235/380 |
| 4,472,626 | 9/1984 | Frid | 235/380 |
| 4,485,300 | 11/1984 | Peirce | 235/380 |
| 4,614,861 | 9/1986 | Pavlov et al. | 235/380 |
| 4,734,564 | 3/1988 | Boston et al. | 235/380 |
| 4,822,985 | 4/1989 | Boggan et al. | 235/380 |
| 4,908,521 | 3/1990 | Boggan et al. | 235/380 |
| 4,943,707 | 7/1990 | Boggan | 235/380 |
| 5,068,894 | 11/1991 | Hoppe et al. | 235/380 |
| 5,175,416 | 12/1992 | Mansvelt et al. | 235/380 |

Primary Examiner—F. Rollins Cross
Assistant Examiner—Erick Solis
Attorney, Agent, or Firm—Heller, Ehrman, White & McAuliffe

[57] ABSTRACT

An authorization matching system for a credit card transaction system assigns the same identification code to authorization and transaction records associated with a particular transaction. The records may be matched by matching the identification number in the records, even if other data in the records does not match.

11 Claims, 4 Drawing Sheets

AUTHORIZATION MATCHING SYSTEM

FIELD OF THE INVENTION

The present invention relates generally to a transaction card payment system. It relates in particular to a transaction card payment system including an authorization matching system for matching records of a transaction generated by members of the transaction card payment system.

BACKGROUND OF THE INVENTION

In recent years the use of transaction cards, such as credit cards, as a substitute for cash has substantially increased. Together with the increase in use of credit cards, the burden of protecting a cardholder or an issuer of the card against the consequences of fraudulent use has also substantially increased. Fraudulent card use may include use of a card by a party other than the cardholder. Fraudulent use of a card may also include misuse of the card by the cardholder, for example, making purchases in excess of the of an approved credit limit, using a card beyond its expiration date, or using a card which has been invalidated for some reason.

A credit card transaction system is usually based around a data control center which includes one or more data processors. Issuers of credit cards generally have direct on-line access to the data control center. Merchant member banks also have direct on-line access to the data control center. A merchant member bank, which may be referred to as an acquirer, is responsible for recruiting merchants to participate in the transaction card payment system. Participating merchants generally have a data gathering terminal for recording or authorizing transactions. The terminal connects the merchant with the aquirer.

The credit card payment system generally functions as follows. A cardholder makes a purchase of goods or services from a merchant. The merchant submits a request for payment to the merchant bank and is reimbursed for the cost of the goods or services, minus a service charge. The merchant bank submits a request for payment to the issuer. The issuer, reimburses the merchant bank, debits the cardholder's account and bills the cardholder for the transaction amount.

If, subsequent to the transaction, the issuer does not receive payment for a transaction, either because of a dispute with the cardholder concerning the transaction or because the transaction was fraudulently made, the issuer may demand repayment by the acquirer for all or part the amount of the original payment made to the acquirer. Such a repayment is generally termed a charge back.

In earlier years the issuer assumed all liability for fraudulent use of cards. The issuer maintained the sole authority for authorizing transactions above a preset limit as a way of protecting against fraudulent use. As the use of credit cards expanded, the cost to the issuer maintaining sole authorization also expanded, to the point where the cost of protection approached the cost of losses due to fraudulent use.

Over the past few years, aided by developments in computer capacity and data transmission capacity, the issuer has been able to delegate authorization of a transaction under certain on-line regulatable conditions, to the data control center. Such an authorization system is disclosed in U.S. Pat. No. 4,485,300, assigned to the assignee of the present invention. In a more recent development, an electronic data acquisition terminal at a merchant's place of business is able to read creditworthiness or risk assessment data from, for example, a magnetic stripe on a cardholder's card. By entering data from the card into the data acquisition terminal authorization of certain purchases below a transaction limit amount, which may be referred to as a floor limit, may be authorized at the point of purchase, i.e. the point of sale. Such an authorization system is described in detail in U.S. Pat. No. 4,734,564, also assigned to the assignee of the present invention.

The more a credit card issuer delegates responsibility for authorization of transactions, the greater the probability that disputes will occur between issuer and acquirer concerning payment rights for transactions above the floor limit which are, or appear to be, fraudulent. Such disputes may arise if a completed transaction record does not have a matching authorization record.

Disputes often occur, for example, when an issuer, having authorized a transaction, receives from an acquirer, a transaction record in the form of a clearing request, i.e., request from a acquirer for payment for the transaction, and one or more descriptive features in the request do not match the description of the transaction in an original authorization record. Matching is not limited, however, to matching transaction amounts. Other data, such as date and time of the transaction, merchant geographical location, and the like, may be included in transaction records. Such data is often used by an issuer, together with cardholder data, for risk assessment or establishing authorization levels.

The process of matching a request for payment and an original authorization is generally termed authorization matching. An authorization mismatch frequently occurs as a result of a transaction being made for a transaction amount more or less than the amount of an authorization request. A mismatch may thus result, for example, when a new transaction amount is finalized after authorization request for a previously estimated different amount is made by the merchant. This may occur, for example, when a transaction card is used to pay for a rental car, or a hotel stay.

It will be appreciated that authorization mismatches place a burden on acquirer, and issuer, alike. Acquirers may be inconvenienced by delay of payment while a mismatching transaction problem is resolved, or by charge backs resulting from unresolved authorization mismatch issues. Aquirers and issuers may be required to incur significant costs for resolving authorization mismatch issues.

A credit card transactions may take place without face-to-face contact, i.e., without presentation of a credit card, for example, when a cardholder orders goods or services by telephone. As such, it may appear that such transactions most frequently lead to authorization mismatch disputes. However, it is estimated that about eighty-five percent of all credit card transactions are face-to-face transactions, and that seventy percent of all charge-back disputes occur as a result of these face-to-face transactions.

Clearly there is a need for an improved system for authorization matching in transaction card payment systems.

Accordingly it is an object of the present invention to provide an improved authorization matching system for credit card transactions.

It is another object of the present invention an improved authorization matching system which may be implemented using modifications of an existing authorization system.

SUMMARY OF THE INVENTION

The present invention is directed to providing a system and method for matching a transaction authorization record supplied by an issuer with a record of the completed transaction supplied by an acquirer. Objects of the invention are achieved by assigning a unique identification code to the records. The records may be matched by matching the unique identification code therein even though other data in the records may not match.

In one preferred embodiment, the system includes an acquirer in communication with a primary processor via a data control center. The system includes a transaction card carrying data identifying a cardholder and data representative of risk assessment information associated with the cardholder.

The system includes a remote terminal located at the point of a transaction and in communication with the acquirer. The remote terminal is used for reading the data carried on the card and for entering data including the amount of the transaction. The remote terminal also includes means for forwarding the transaction amount to the data control center via the acquirer for evaluation.

The data control center includes means for authorizing the transaction, means for assigning an identification code to the transaction, and means for forwarding the identification code to the primary processor for forming a transaction authorization record including the identification code, and to the acquirer for forming a completed transaction record including the identification code. Records or communications transmitted between the issuer and the acquirer concerning the completed transaction and the transaction authorization of the transaction may be matched by matching the identification code in each record or communication.

In the authorization matching method, cardholder data carried on the card are read from the card into the terminal. The transaction amount of the transaction is also entered into the terminal. The cardholder data and the transaction amount are then forwarded forwarding via an acquirer to the data control center for authorization.

At the data control center a unique identification code is assigned to the transaction. The unique identification code and the transaction are forwarded to the primary processor where a first authorization record including the unique identification code is created. The unique identification code is also forwarded to the acquirer for creating a first transaction record of the completed transaction, the first transaction record including the unique identification code.

Communications between the issuer and the acquirer concerning the first transaction record and the first authorization record, may be matched by matching the authorization number in each record, even if other data in the records do not match.

Additionally the acquirer may form a second authorization record including the identification code, and the unique identification code may be forwarded to the terminal. The identification code may be included with other data stored in the terminal concerning the transaction and then forwarded as a second transaction record to the acquirer. The acquirer may thus match the second transaction record with the second authorization record by matching the identification code in each record.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

DETAILED DESCRIPTION OF THE INVENTION

Figure 1:
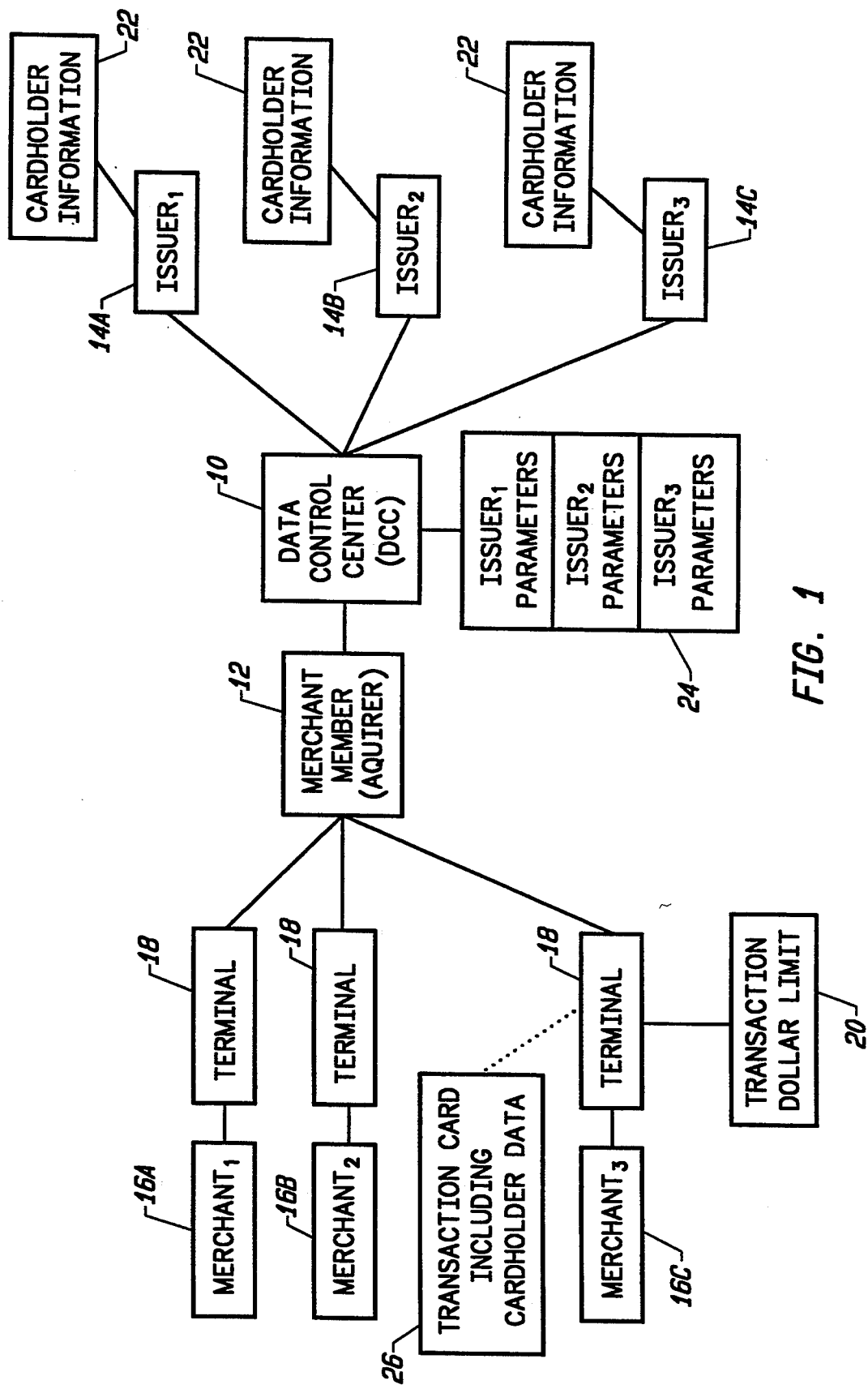
FIG. 1 is a block diagram illustrating a transaction card payment system of according to the prior art.

Turning now to the drawings FIG. 1 illustrates, in block form, an example of a transaction card payment and authorization system in which the present invention may be implemented. Such a system is described in detail in U.S. Pat. No. 4,734,564, assigned to the assignee of the present invention, the complete disclosure of which is hereby incorporated herein by reference. A summary of the operation of the system is set forth below to facilitate a description of the present invention.

A data control center 10 forms the hub of the system. An acquirer 12 and a plurality of issuers 14A-14C are in communication with the data control center via the data control center 10. The issuers and an acquirer may thus communicate or transmit records via the data control center. For clarity, data control center 10 is shown in FIG. 1 as single entity. Data control center 10 however may include, at a central, or base location, one, two or more processors or computers each having a different function in the system. Additionally, there may be a plurality of remote data control centers. The remote data control centers may be located for example in one or more cites in the USA or in a city in a foreign country. The computers may be networked to form the complete data control center.

Acquirer 12 is a merchant member bank of the system, and is responsible for recruiting merchants into the system and maintaining credit service for those merchants. Acquirer 12 is in communication with a plurality of merchants 16A-16C via at least one remote terminal 18, usually located in the merchant's premises.

As will be appreciated, the system may include significantly more than the three merchants shown in FIG. 1, and more than one acquirer, for example, acquirers 12A and 12B. For clarity, however, the system is further described terms of only one such terminal at only one merchant location.

Terminal 18 may include means, such as a microprocessor, for determining a transaction dollar limit or floor limit 20, transaction amounts in excess of which must be authorized by data control center 10 or by credit card issuer 14C. Each issuer maintains a primary processor which may be used for evaluating transaction authorization requests. As such the terms issuer and primary processor are used interchangeably, and by the same reference numeral, throughout the following description. The primary processor 14C may also be used by the issuer for maintaining cardholder accounts and other cardholder information 22 such as payment records, frequency of card use and the like. Such cardholder information may be used for computing cardholder creditworthiness and risk assessment information.

The data control center 10 may include files 24 containing a set of parameters established by each issuer in the system. Files 24 are used to determine if a transaction may be authorized by the data control center, or forwarded to the primary processor 14C (the issuer) for authorization.

When a cardholder desires to make a purchase from merchant 16C the amount of the desired transaction is entered into terminal 18 together with cardholder data read from a transaction card 26, such as a credit card. If terminal 18 determines from the data that the desired transaction amount is in excess of the floor limit, a request for authorization is forwarded. The authorization request is first forwarded to acquirer 12. The authorization request is then forwarded by acquirer 12 to data control center 10 where it may be authorized directly or passed to issuer 14C for authorization. If the transaction is authorized by issuer 14C, the authorization is recorded and adjustments are made to a the cardholder's account and to the cardholder's credit availability or open-to-buy. If the transaction is authorized, either by data control center 10 or by issuer 14C, authorization is forwarded by data control center 10 to merchant 16C through acquirer 12.

Having received authorization, merchant 16C may complete the transaction and make a record of the transaction, including at least the transaction amount, and other data, for example, the date of the transaction.

As discussed above, the sequence of operations for reimbursing the merchant for the transaction may proceed generally as follows: Merchant 16 submits a record of the completed transaction to acquirer 12. The acquirer 12 credits the merchant's account for the cost of goods sold minus the merchant discount and service fee. The acquirer 12 submits a clearing request for payment to issuer 14C via data control center 10. The issuer 14C compares the clearing request with the authorization, i.e. the issuer compares a record of the completed transaction with a record of the authorization. If certain data in the records, for example the amount of the transaction, match within predetermined tolerance limits, the transaction amount is forwarded to acquirer 12, the cardholder's account is adjusted according to the transaction amount, the issuer bills the cardholder and replenishes the cardholder's credit.

Although the majority of the above described procedure is generally accomplished by electronic data transfer, sufficient opportunity for erroneous data entry or inadvertent record alteration exists an acquirer location, and particularly at a merchant location, that some transactions requiring authorization may produce transaction records and authorization records which do not match within the predetermined tolerances established by an issuer. These mismatching records lead to chargebacks to acquirers, and payment disputes which place a costly burden on the system.

It has been determined that by assigning a unique identifying code to each transaction, at the time authorization for the transaction is requested, and by including that code in all subsequently generated records of the transaction, the incidence of mismatching records can be almost entirely eliminated. The identification code may be simply a number, or a combination of letters, numbers, or symbols.

Such a method may be implemented by improvements to an existing transaction card payment system network, such as the system of FIG. 1.

As will be evident from the following detailed description of the matching method, cooperation at least by an acquirer, and preferably by a merchant, will be required for the method to be most effective. This cooperation may be won by offering a suitable incentive. For example, an issuer may guarantee payment to an acquirer and significantly reduce chargeback liability if predetermined conditions are fulfilled by the acquirer. The method may be implemented such that an acquirer who does not desire to take advantage of the benefits the method offers may continue to use the existing network without any change in procedure.

Figure 2:
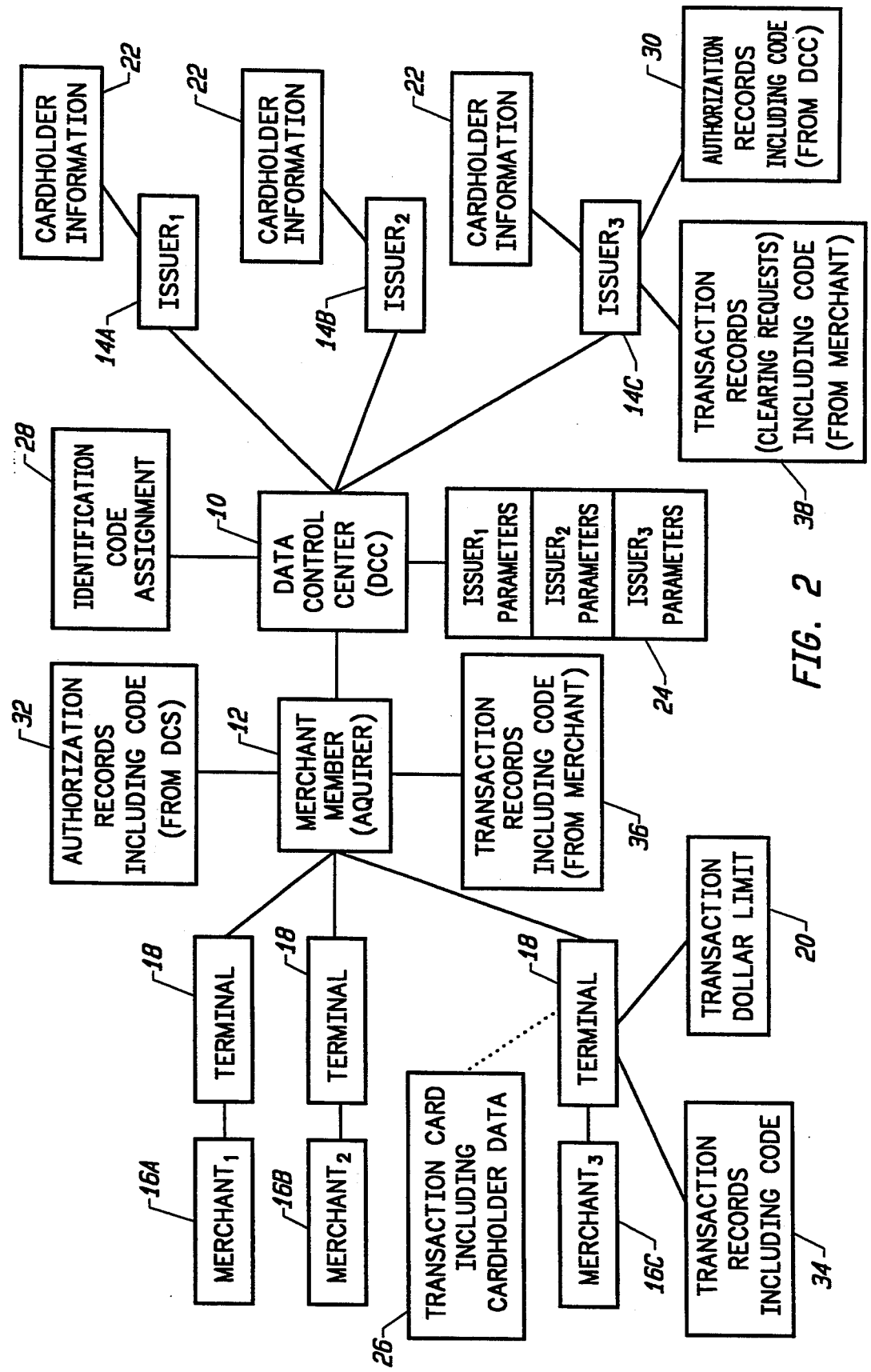
FIG. 2 is a block diagram illustrating a transaction card payment system for implementing an authorization matching method according to the present invention.

Improvements to the system of FIG. 1 are illustrated in block form in FIG. 2. Here, an identification code assignment facility 28 is added to data control center 10. Operation of identification code assignment facility 28 is triggered when an authorization request from acquirer 12 is received by data control center 10. As already discussed data control center 10 may include more than one processor. Accordingly even though, for clarity, assignment code facility 28 is shown as a single entity the facility may be distributed may exist in selected ones or all processors in the data control center.

The identification code assignment facility 28 assigns an identification code to the transaction which is forwarded together with the requested transaction amount to issuer (primary processor) 14C, where it may be filed as an authorization record in authorization record files 30. A transaction code and amount are transmitted to primary processor 14C, even if the transaction is authorized at data control center 10. The identification code is also transmitted to acquirer 12 by data control center 10. Authorization record files 32 including the identification code may be maintained by an acquirer. The identification code may also be forwarded by acquirer 12 to merchant 16C. Merchant 16C may store the transaction code together with other transaction data including the amount in completed transaction record files 34 in terminal 18. Such files would usually be stored until the end of the business day and then forwarded as a batch to acquirer 12 for payment.

Acquirer 12 may also maintain transaction record files 36 for storing transaction records, received from several merchants, until it is convenient to match them with authorization records stored in files 32. Clearing requests (i.e. acquirer's transaction records) from acquirer 12 to issuer 14C, may be stored in files 38 by issuer 14C, i.e. until it is convenient to match them against authorization records in files 30.

As discussed above, an identification code may be a simply a number, or a combination of letters and numbers. It is important however that each identification code is unique, i.e. that no possibility exists to assign the same number to different transactions One method of generating a unique identification code, in the form of a number 23 characters long, is set forth below. A major transaction card payment system may be required to process up to about ten million transactions per day. A code may be generated by one, two, or more computers in a data control center in which the transactions are processed. A computer typically includes a capability to generate a date and time of day. Accordingly a computer in a processor in data control center 10 generates, an identification number which includes:

- one character identifying the processor in a data control center base generating the code;
- two characters identifying the remote data control center generating the code;
- five characters identifying the date on which the code was generated; the five characters comprising, for example, the last two digits of the year, and the day as a number between one and three-hundred-sixty-six;
- six characters identifying the time of the transaction to the nearest second, i.e., two characters each for hours, minutes and seconds;
- eight characters representing a transaction sequence number, in effect a transaction counter, having the capability to count up to 99,999,999 transactions; and
- one character for a check digit.

The check digit is generated by an algorithm maintained at the data control center. The algorithm mathematically manipulates characters in the code representative of code generating systems, date, time, and sequence to produce a single characteristic check digit. All records including an identification code, submitted to the center have system time, date, and sequence characters in the code manipulated by the algorithm to produce a check digit for comparison with the check digit in the ID code.

Such a number assignment method is readily implemented on computers currently used for transaction card data processing. The above described number assignment method yields a unique transaction number for each transaction processed, even over decades of system operation.

Figure 3:
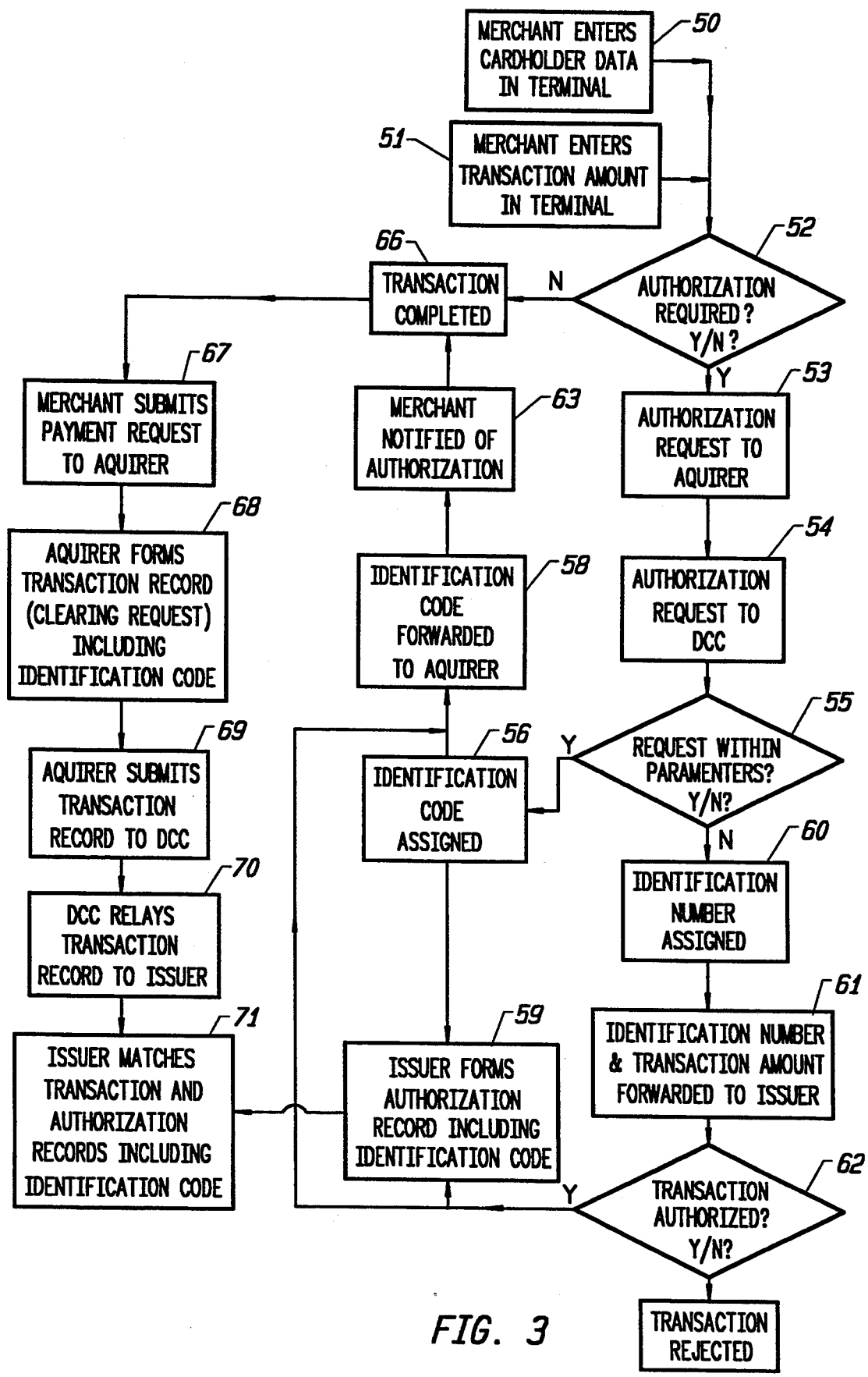
FIG. 3-4 are flow charts illustrating preferred embodiments of the authorization matching method of the present invention.

Continuing now with a detailed description of the authorization matching method, one embodiment of the method is illustrated in flow chart form in FIG. 3.

When a cardholder wishes to make a purchase (transaction), a merchant reads cardholder data from a cardholder's transaction card into a data gathering terminal (Step 50). The merchant then enters the amount of the desired transaction into a the data gathering terminal (Step 51). The cardholder data may be used to establish a transaction dollar limit for the cardholder. If the amount of the desired transaction exceeds this limit (Step 52), transaction authorization must be requested.

If authorization is requested, a transaction authorization request is forwarded from the terminal to an acquirer (Step 53). The acquirer forwards the request to a data control center (Step 54).

The data control center evaluates the request according to evaluation parameters established by an issuer of the transaction card. If the transaction request is within the parameters (Step 55), the data control center assigns an identification code to the transaction (Step 56).

The data control center forwards the amount of the authorization to the issuer of the credit card together with the identification code (Step 57) and also forwards the authorization code to the acquirer (Step 58).

The issuer makes a record of the authorization including the identification code and the requested amount to form an authorization record (Step 59).

If the request is not within the parameters established by the issuer (Step 55), the data control center assigns an identification code to the transaction (Step 60) and forwards request together with the identification code to the issuer for evaluation (Step 61).

When a transaction is authorized by the issuer, the issuer notifies the data control center and the data control center, in turn notifies the acquirer. The acquirer the forwards the authorization to the merchant (Step 63).

After the merchant has completed the transaction (Step 66), the merchant forwards a request for payment to the acquirer (Step 67). The acquirer forms a first transaction record including the identification code (Step 68) and forwards this record to the issuer, via the data control center (Steps 69 and 70). The issuer may then match the acquirer's transaction record with the first authorization record by comparing, i.e. matching, the transaction code in each of the records (Step 71).

Figure 4:
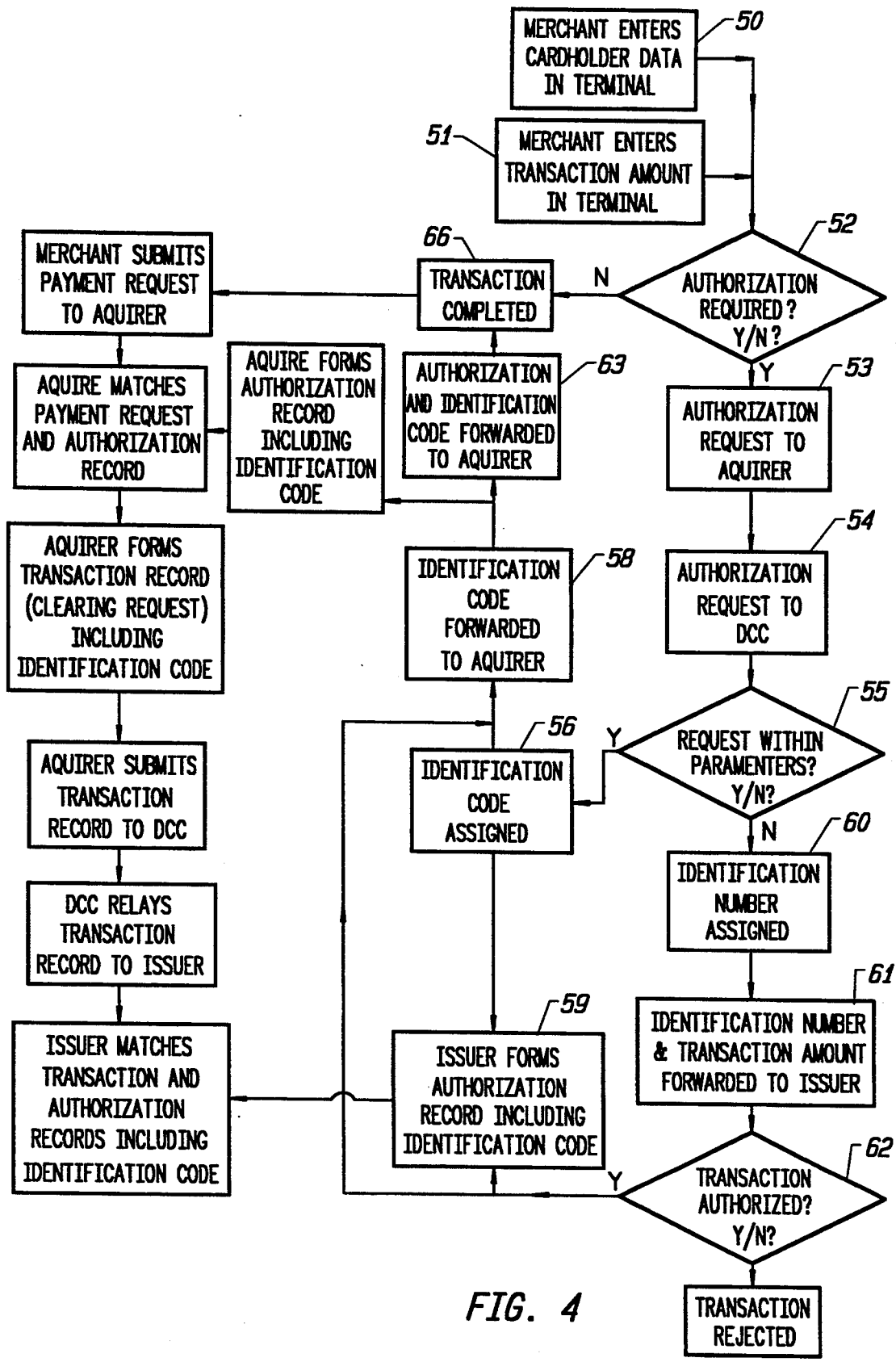

Referring now to FIG. 4, another embodiment of the authorization matching method is illustrated in flow chart form. The method proceeds according to the steps of the embodiment of FIG. 3, up to Step 58. Thereafter, the acquirer forwards the identification code to the merchant via the terminal on receipt of the transaction authorization and the transaction code number (Step 80). The acquirer also forms and stores an second authorization record, including the identification code (Step 81). The merchant forms a transaction record including the identification code.

The merchant forwards the second transaction record including the identification code to the acquirer as a request for payment Step 82. The acquirer then matches the second transaction record with the second authorization record authorization record by comparing the identification code in each record (Step 84). It should be noted that in the last described embodiment, the terms first and second are attached to the above transaction and records merely for convenience of description, rather than to specify a specific sequence of operations. Identification codes in records may be compared independent of the sequence in which the records were generated.

In summary, a system and method for matching authorization records and transaction records in a transaction card payment system has been described. By assigning a unique transaction code or number to all records of an authorized transaction, the records may be matched by matching the transaction code even if other data in the records does not match.

The method may be implemented by modifications to an existing transaction card payment system. The modifications may be made such that all users of the system are not required to take advantage of the authorization matching system. For those electing not to participate the system will continue to function as it did before modification. The authorization matching system may be used by an issuer of credit cards and a merchant member bank. Additionally, a merchant may participate in the system by using a remote terminal to transmit receive and store transaction data including the unique transaction code.

The present invention has been described in terms of a preferred embodiment and an alternate embodiment. The invention, however, is not limited to the embodiments described and depicted. Rather, the scope of the invention is defined by the appended claims.

What is claimed is:

1. A transaction card payment and authorization matching system, comprising:

a transaction card issued to a cardholder as a means for transferring value from a cardholder to a merchant, said transaction card carrying cardholder data;

an issuer who issues transaction cards;

an acquirer in communication with the issuer via a data control center;

remote terminal means located at a point of a transaction and in communication with the acquirer, said remote terminal including means for reading the data carried on said card and means for entering data including the amount of the transaction, and said remote terminal means including means for forwarding said transaction amount via the acquirer to the data control center for authorization;

said data control center including means for assigning an identification code representative of said transaction to the transaction and forwarding said identification code to the issuer and the acquirer for inclusion in records of the transaction; and means for comparing the identification code representative of said transaction in said records to verify that said records represent the transaction.

2. The system of claim 1 further including means for forwarding the identification code to said remote terminal means.

3. The system of claim 2 wherein said remote terminal means further includes means for storing said identification code together with other data concerning said transaction and means for forwarding said other transaction data together with said identification code to the acquirer.

4. A transaction card payment and authorization matching system, comprising:

primary processor means including file means including cardholder information, supplied by a transaction card issuer, for evaluating a transaction;

a transaction card carrying data identifying the cardholder, said card further including nonmonetary data representative of risk assessment information associated with the cardholder;

remote terminal means located at the point of the transaction and connected to said primary processor means via an acquirer and a data control center, said remote terminal means having monetary data stored therein, said remote terminal means having means for reading the nonmonetary data carried on said card and means for entering data including the amount of the transaction, said terminal means further including remote processor means for deriving a transaction amount limit based on the risk information carried on said card and the monetary data stored in said terminal means, and said remote terminal including means forwarding said transaction amount to the data control center via the acquirer for evaluation if the transaction exceeds said transaction amount limit;

said data control center including means for authorizing the transaction, means for assigning a unique identification code to the transaction and means for forwarding said unique identification code to the primary processor and the acquirer; and whereby communications between the primary processor and the acquirer concerning the transaction and the authorization of the transaction may be matched solely by means of said unique identification code.

5. The system of claim 4 wherein said communications include a first authorization record of the transaction formed by the acquirer and a first transaction record of the completed transaction formed by the acquirer, said first transaction record and said first authorization record including the unique identification code.

6. The system of claim 5 wherein said primary processor means includes means for storing said first authorization record of the transaction.

7. The system of claim 6 wherein the acquirer has means for storing a second authorization record of the transaction including the unique identification code.

8. The system of claim 7 further including means for forwarding the unique identification code to said remote terminal means.

9. The system of claim 8 wherein said remote terminal means further includes means for storing said unique identification code together with other data concerning said transaction, and means for forwarding a second transaction record including said other transaction data together with said unique identification code to the acquirer, whereby the acquirer may match said second transaction record with said second authorization record by means of the unique identification code, 10. In a transaction card payment system including a transaction card carrying data identifying the cardholder and data representative of risk assessment information associated with the cardholder, a terminal located at the point of the transaction having data entry capability and means for reading data carried on said transaction card, a primary processor maintained by an issuer of the transaction cards for evaluating transactions, and a data control center connected between said remote terminal means and said primary processor, a method for matching a transaction authorization record supplied by the issuer with a record of the completed transaction supplied by an acquirer, the method comprising:

entering the cardholder identification and risk assessment data into the terminal;

entering the amount of the transaction into the terminal;

forwarding the cardholder identification data and transaction amount via an acquirer to the data control center;

assigning a unique identification code to the transaction;

forwarding the transaction amount and the unique identification code from the data control center to the primary processor and creating a first authorization record including the unique identification code;

forwarding the unique identification code from the data control center to the acquirer and creating a first transaction record including the unique identification code; and matching said first transaction record and first said authorization record by means of the unique identification code.

11. The method of claim 10 further including:

forming a second authorization record including the identification code;

forwarding the unique identification code to said terminal;

forming a second transaction record including the identification code at said terminal;

forwarding said second transaction record from said terminal to the acquirer; and matching said second transaction record with said second authorization record by means of the identification code.

* * * * *